US009195858B2

(12) United States Patent
Trantham (10) Patent No.: US 9,195,858 B2
(45) Date of Patent: Nov. 24, 2015

(54) ENCRYPTED DATA STORAGE DEVICE (75) Inventor: Jon David Trantham, Chanhassen, MN (US)

(73) Assignee: Seagate Technology LLC, Cupertino, CA (US)

( * ) Notice: Subject to any disclaimer, the term of this patent is extended or adjusted under 35 U.S.C. 154(b) by 1470 days.

(21) Appl. No.: 12/535,219

(22) Filed: Aug. 4, 2009

(65) Prior Publication Data
US 2011/0035813 A1 Feb. 10, 2011

(51) Int. Cl.
G06F 1/26 (2006.01)
G06F 21/78 (2013.01)
G06F 21/86 (2013.01)
H04L 9/08 (2006.01)

(52) U.S. Cl.
CPC ............... *G06F 21/78* (2013.01); *G06F 21/86* (2013.01); *H04L 9/0841* (2013.01); *H04L 9/0897* (2013.01)

(58) Field of Classification Search
CPC ........ G08B 13/00; G08B 13/02; G08B 13/06; G08B 13/16; G08B 23/00; G08B 21/00; G08B 29/00; G06F 21/86; G06F 21/88
USPC ...................................... 726/35, 34
See application file for complete search history.

(56) References Cited

U.S. PATENT DOCUMENTS

| | | | |
|---|---|---|---|
| 5,459,850 A | 10/1995 | Clay et al. | |
| 5,744,244 A | 4/1998 | Camilletti et al. | |
| 6,321,335 B1 * | 11/2001 | Chu | 726/28 |
| 2002/0112156 A1 * | 8/2002 | Gien et al. | 713/156 |
| 2002/0152392 A1 * | 10/2002 | Hardy et al. | 713/189 |
| 2003/0046568 A1 * | 3/2003 | Riddick et al. | 713/193 |
| 2005/0244037 A1 * | 11/2005 | Chiu et al. | 382/124 |
| 2005/0262361 A1 * | 11/2005 | Thibadeau | 713/193 |
| 2006/0041934 A1 * | 2/2006 | Hetzler | 726/9 |
| 2006/0133607 A1 | 6/2006 | Forehand et al. | |
| 2006/0174352 A1 * | 8/2006 | Thibadeau | 726/27 |
| 2006/0198515 A1 | 9/2006 | Forehand et al. | |
| 2007/0033454 A1 | 2/2007 | Moss et al. | |
| 2007/0192631 A1 | 8/2007 | Anderson | |
| 2008/0002372 A1 * | 1/2008 | Kelso et al. | 361/737 |
| 2008/0072071 A1 * | 3/2008 | Forehand et al. | 713/193 |
| 2008/0141382 A1 * | 6/2008 | Jonas | 726/34 |
| 2009/0046858 A1 | 2/2009 | Iyer et al. | |
| 2009/0049311 A1 * | 2/2009 | Carlson et al. | 713/193 |
| 2009/0052665 A1 * | 2/2009 | Goodman et al. | 380/44 |
| 2009/0077389 A1 | 3/2009 | Matthews, Jr. | |
| 2009/0089590 A1 | 4/2009 | Challener et al. | |
| 2009/0100273 A1 | 4/2009 | Miller | |
| 2009/0110191 A1 | 4/2009 | Sanvido et al. | |
| 2014/0373166 A1 * | 12/2014 | Little | 726/26 |

OTHER PUBLICATIONS

Atmel Data Sheet, AT88SA102S, Product Authenticiation Chip, 24 pages, Mar. 2009.

* cited by examiner

*Primary Examiner* — Tamara T Kyle (74) *Attorney, Agent, or Firm* — Westman, Champlin & Koehler, P.A.

(57) ABSTRACT

A data storage device has encrypted user data and a media key stored on media, and a root key stored in an electronic circuit. The data storage device has a first connector adapted to receive a user key and a hardware key device connected to a second connector adjacent an installation space. The hardware key device stores a destructible key in non-volatile memory. The hardware key device is mechanically destroyed, thereby rendering the encrypted user data non-decipherable after the destroying.

17 Claims, 9 Drawing Sheets

ENCRYPTED DATA STORAGE DEVICE

BACKGROUND

The present disclosure relates to encrypted data storage devices. During a time when an encrypted data storage device is in shipment prior to installation in a host computer, there is a desire to deter theft or pilferage of the encrypted data storage device. After an encrypted data storage device has been used and taken out of service, there is a desire to destroy encrypted data on the device.

Aspects disclosed provide solutions to these and other problems, and offer other advantages over the prior art.

SUMMARY

Disclosed is a data storage device and a method of protecting data stored on a data storage device. The data storage device is provided with encrypted user data and a media key stored on media. The data storage device is provided with a root key stored in an electronic circuit.

The data storage device is provided with a first connector adapted to receive a user key and a second connector adjacent an installation space. A hardware key device is installed in the installation space and connected to the second connector. The hardware key device is provided with a non-volatile memory storing one or more destructible keys. After use of the data storage device, the hardware key device is mechanically destroyed. The encrypted user data can no longer be decrypted after the hardware key device is destroyed, rendering it permanently non-decipherable.

Other features and benefits that characterize the disclosed aspects will be apparent upon reading the following detailed description and review of the associated drawings.

DETAILED DESCRIPTION

In the aspects described below, a data storage device includes data storage media that stores a media key and encrypted data. An encryption/decryption engine communicates the encrypted data to the data storage media. The encryption/decryption engine encrypts data that is stored to the storage media and decrypts the encrypted data that is retrieved from the storage media as a function of the media key, a root key, a user key and a destructible key.

A circuit card assembly connects the encryption/decryption engine to the data storage media. The circuit card assembly includes the root key. Preferably, the root key is stored within the same die as the encryption/decryption engine. A connector on the circuit card assembly receives the user key from a host. An electrical interface on the circuit card assembly receives the destructible key from a hardware key device including nonvolatile memory.

In certain embodiments, the hardware key device is attached to the circuit card assembly via an electrical connector. As such, the hardware key device may be easily detached from the circuit card for safekeeping or destruction. The key may also be replaced with a new key if desired.

In certain embodiments, the hardware key device is soldered directly to the circuit card. The hardware key device is installed in a position where the hardware key device is exposed to receive a destructive mechanical force in-situ. Tamper resistant packaging, wherein the die is destroyed when the package is crushed can be used. Authentication key devices are used in smart cards and battery authentication applications which might also be used as hardware key devices.

The hardware key device may be electrically connected to the encryption/decryption engine in order to communicate a destructible key from the nonvolatile memory to the encryption/decryption engine.

Data storage devices such as disc drives and solid-state drives are vulnerable to security problems. A drive, while in transport between a seller and an end user, can be stolen. The drive can be stolen while it is in shipment or in the buyer's inventory waiting for installation in an end-user computer. Once installed in the end-user computer, tools are typically needed to remove the drive, and the risk of theft is somewhat reduced.

When a drive reaches an end of its useful life, there is a desire to ensure that data that was once stored on the drive is destroyed. Using computer delete commands to delete files is typically an unsecure way to obliterate data because typically the delete command only removes the file name from a directory and leaves the file data intact and recoverable on the drive. Reformatting disc drives is slow and only partially effective in removing data from disc drives since some data that is imperfectly aligned with tracks on the disc drive remains readable, and can often be expanded using error correction decoding. Similarly, in flash chips, residual gate charge may remain, even after erasure. Also, flash blocks are known to wear out and fail to erase. Additionally, there is the small, but statistically significant probability of the data storage device's controlling circuitry breaking during normal usage. In this case the device may be incapable of performing erasure, yet the media data may be perfectly intact. Physical destruction of the storage media surfaces in the disc drive and flash chips in a solid-state drive is labor intensive and requires the use of several tools needed to disassemble or break the chassis of the drive and to pulverize the storage media.

Storage devices are frequently used in industries where an auditable verification of the destruction of data is beneficial. For instance, data storage devices are used to store private medical information. Laws, such as the Health Insurance Portability and Accountability Act enacted in the United States in 1996, require physical safeguards against the access of private health information. In these and many other scenarios, the auditable, visual confirmation of the destruction of data may be especially beneficial.

A data storage device and associated methods are needed to provide a data storage device that is resistant to physical theft before use and resistant to data theft when repurposing the data storage device or disposing of the data storage device at the end of its useful life.

Figure 1A:
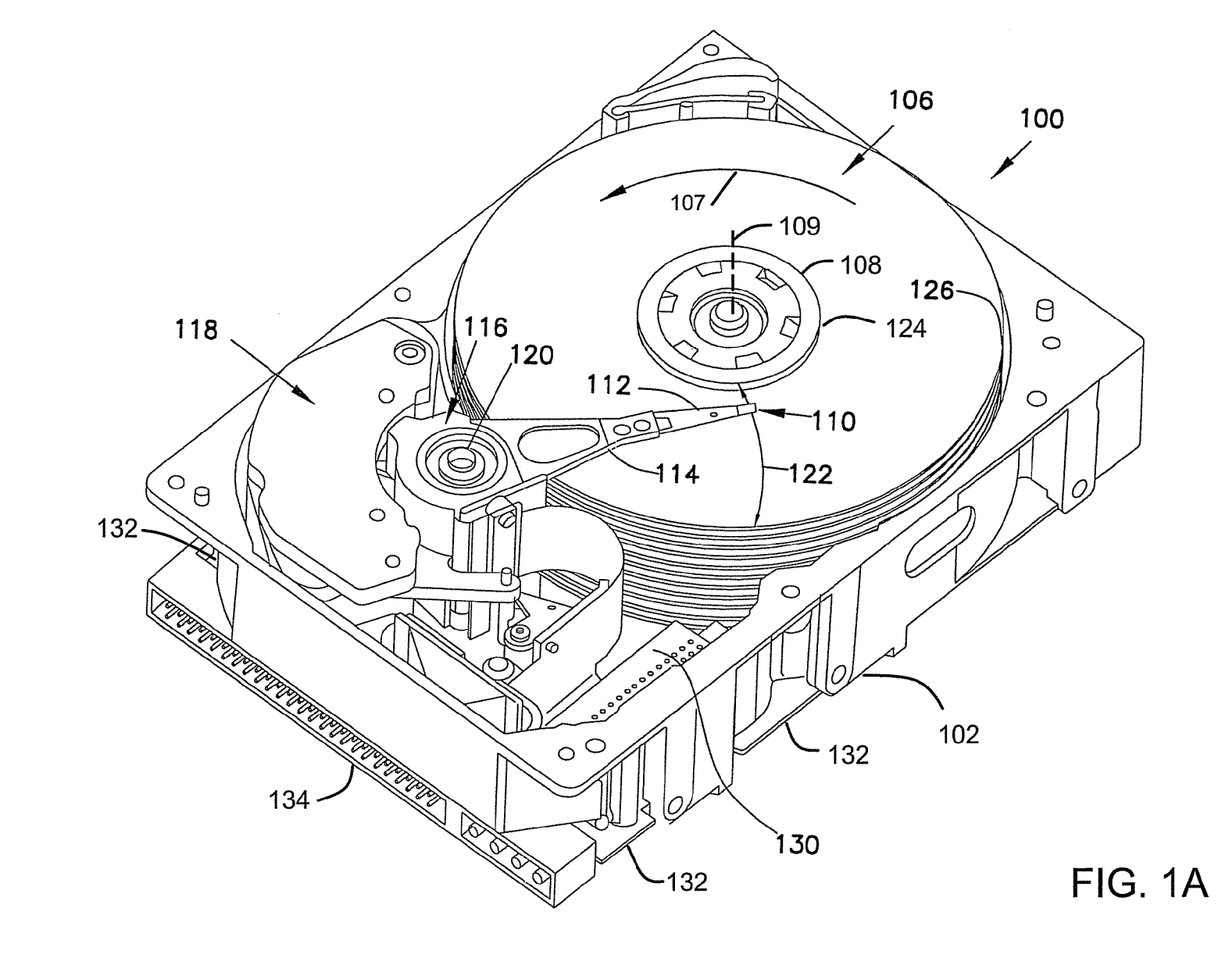
FIG. 1A is an isometric view of a hard disc drive.

FIG. 1A illustrates an oblique view of a disc drive 100 in which the presently disclosed encryption and decryption are useful. Disc drive 100 includes a housing with a base 102 and a top cover (not shown). Disc drive 100 further includes a disc pack 106, which is mounted on a spindle motor (not shown) by a disc clamp 108. Disc pack 106 includes a plurality of individual discs, which are mounted for co-rotation in a direction 107 about a central axis 109. Each disc surface has an associated disc head slider 110 which is mounted to disc drive 100 for communication with data storage media on the disc surface. In the example shown in FIG. 1, sliders 110 are supported by suspensions 112 which are in turn attached to track accessing arms 114 on a pivotal mount 116. The actuator shown in FIG. 1 is of the type known as a rotary moving coil actuator and includes a voice coil motor (VCM), shown generally at 118. Voice coil motor 118 rotates the pivotal mount 116 with its attached heads 110 about a pivot shaft 120 to position heads 110 over a desired data track along an arcuate path 122 between a disc inner diameter 124 and a disc outer diameter 126. Voice coil motor 118 is driven by servo electronics 130 based on signals generated by heads 110 and a host computer (not shown in FIG. 1).

The disc drive 100 includes a circuit card assembly 132 that includes a connector 134 for connection to a host computer. In accordance with certain aspects, the connector 134 includes a SAS, FC-AL, SCSI, PCI-E, IDE, AT, ATA, SATA, IEEE-1394, USB or other connector adapted for connection to a host.

Figure 1B:
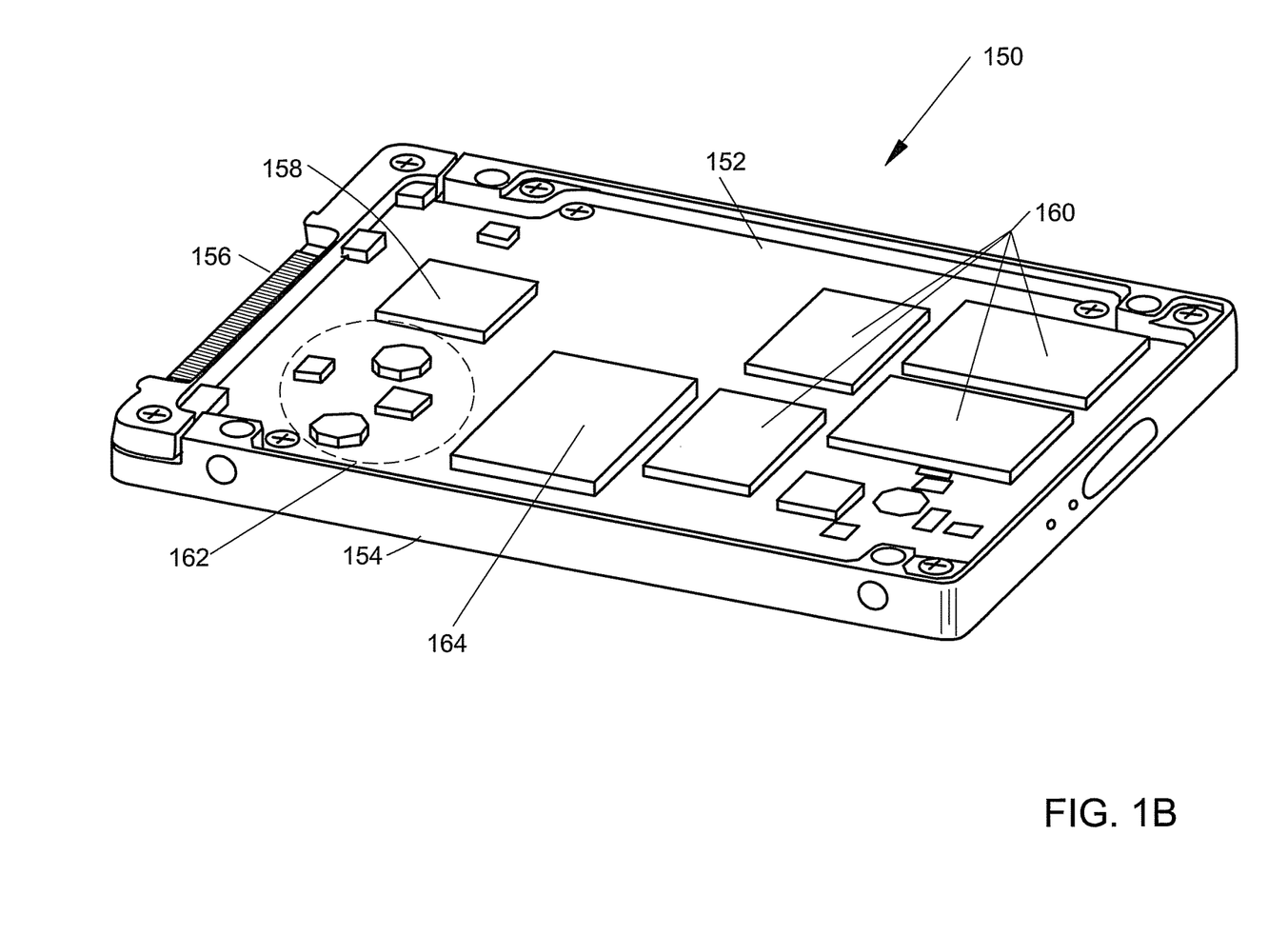
FIG. 1B is an isometric view of a solid-state drive.

FIG. 1B illustrates an oblique view of a solid state drive (SSD) 150 in which the presently disclosed device is useful. SSD 150 includes one or more circuit card assemblies 152 and typically includes a protective, supportive housing 154, a top cover (not shown), and one or more interface connectors 156. SSD 150 further includes a controller ASIC 158, one or more nonvolatile memory devices 160, and power regulation circuitry 162. The nonvolatile memory devices 160 are essentially the SSD's data storage media. In some applications, SSD 150 further includes a power-backup energy storage device, such as a super-capacitor 164.

In accordance with certain aspects, the solid-state drive 150 includes a circuit card assembly 152 that includes a connector 156 for connection to a host computer. In accordance with certain aspects, the connector 156 includes a SAS, FC-AL, SCSI, PCI-E, IDE, AT, ATA, SATA, IEEE-1394, USB or other interface connector adapted for connection to a host.

Figure 2:
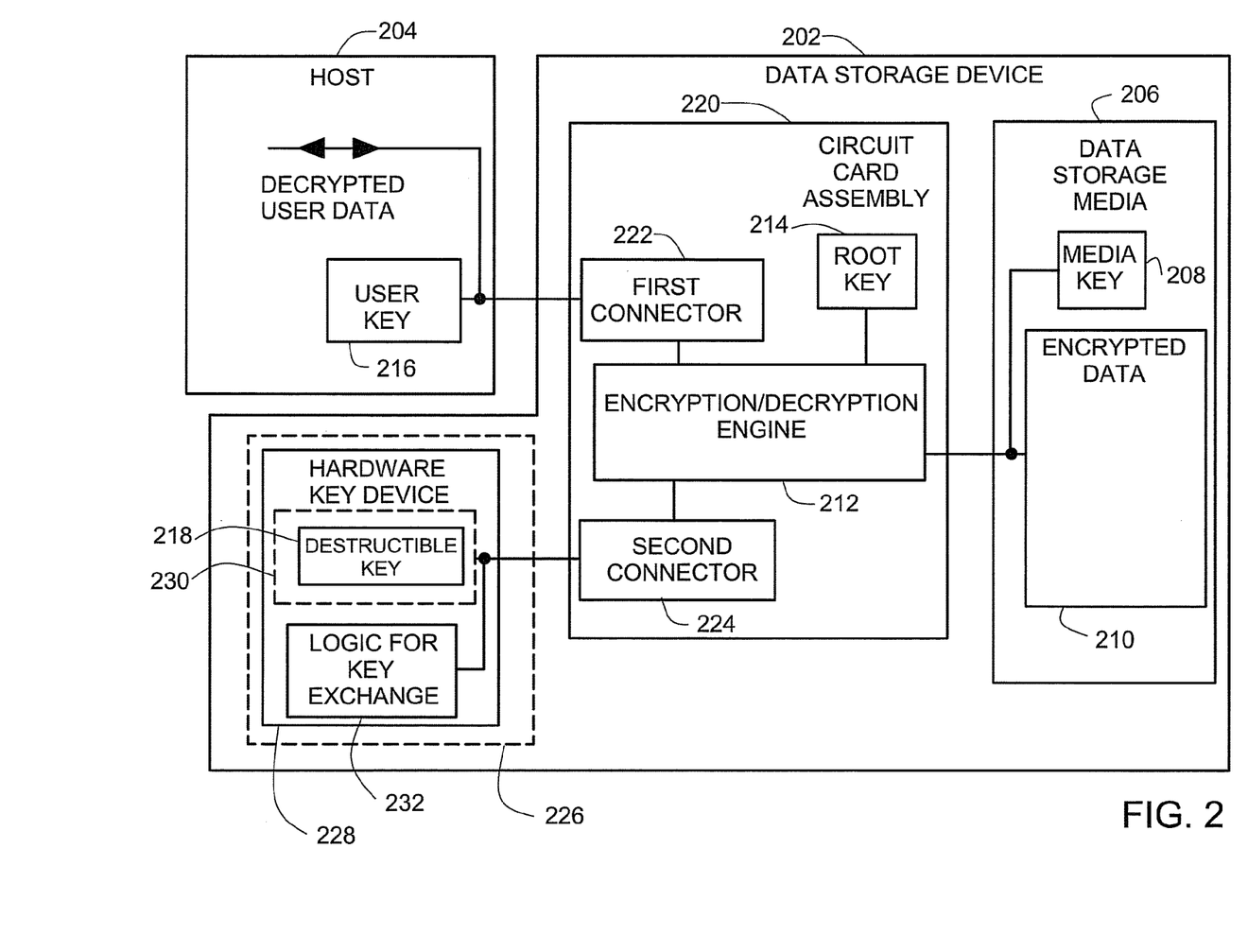
FIG. 2 illustrates a block diagram of a data storage device connected to a host.

FIG. 2 illustrates a block diagram of a data storage device 202 (such as disc drive 100 in FIG. 1A) connected to a host 204 (such as a personal computer). The data storage device 202 includes data storage media 206 (such as disk pack 106 in FIG. 1). The data storage media 206 stores a media key 208 and encrypted data 210.

The data storage device 202 includes an encryption/decryption engine 212. The encryption/decryption engine 212 communicates the encrypted data 210 to the data storage media 206. The encryption/decryption engine 212 decrypts the encrypted data 210 that is read from the storage media 206 as a function of the media key 208, a root key 214, a user key 216 and a destructible key 218.

The data storage device 202 includes a circuit card assembly 220. The circuit card assembly 220 connects the encryption/decryption engine 212 to the data storage media 206. The circuit card assembly 220 includes the root key 214. In accordance with certain aspects, the root key 214 is stored in a nonvolatile memory on the circuit card assembly 220 within the same die as the encryption/decryption engine 212. The root key is preferably kept private to the encryption/decryption engine, stored in such a manner so that it is not prone to hacking. The circuit card assembly 220 includes a first connector 222 that receives the user key 216 from a host. The user key typically is provided from a key server attached to the host system containing the data storage device 202, but there are many alternative ways of generating and providing user keys. For example, a user can enter a password on a keyboard attached to a computer in the host system, or could touch the biometric sensor of a key-generation device. The circuit card assembly 220 includes a second connector 224 that receives the destructible key 218.

The data storage device 202 includes an installation space 226. The installation space 226 is adjacent the second connector 224. A hardware key device 228, which includes the destructible key 218, connects to the second connector 224. The hardware key device 228 includes nonvolatile memory 230 in which the destructible key 218 is stored. The hardware key device 228 is installed in the installation space 226 in a position where the hardware key device 228 is exposed to receive a destructive mechanical force, and where the hardware key device 228 is connected to the second connector 224 to communicate the destructible key 218 from the nonvolatile memory 230 to the encryption/decryption engine 212.

In accordance with certain aspects, the destructible key 218 includes a uniquely valid key for use with a first unique combination of root key 214 and media key 208 in the data storage device. The destructible key 218 is not valid for use with other data storage devices having combinations of root keys and media keys that are different than the first unique combination. Accordingly, a destructible key 218 for one instance of a data storage device is uniquely valid for only that instance of a data storage device, and is not valid for another instance of a data storage device, even when the one instance and the other instance are of the same model number. In accordance with certain aspects, it is not possible to take a destructible key 218 from one data storage device and use it in any other data storage device.

In accordance with certain aspects, the hardware key device 228 includes logic circuitry 232 that performs secure key exchange between the nonvolatile memory 230 and the encryption engine 212. According to further aspects, the secure key exchange includes Diffie-Hellman key exchange.

Figure 3:
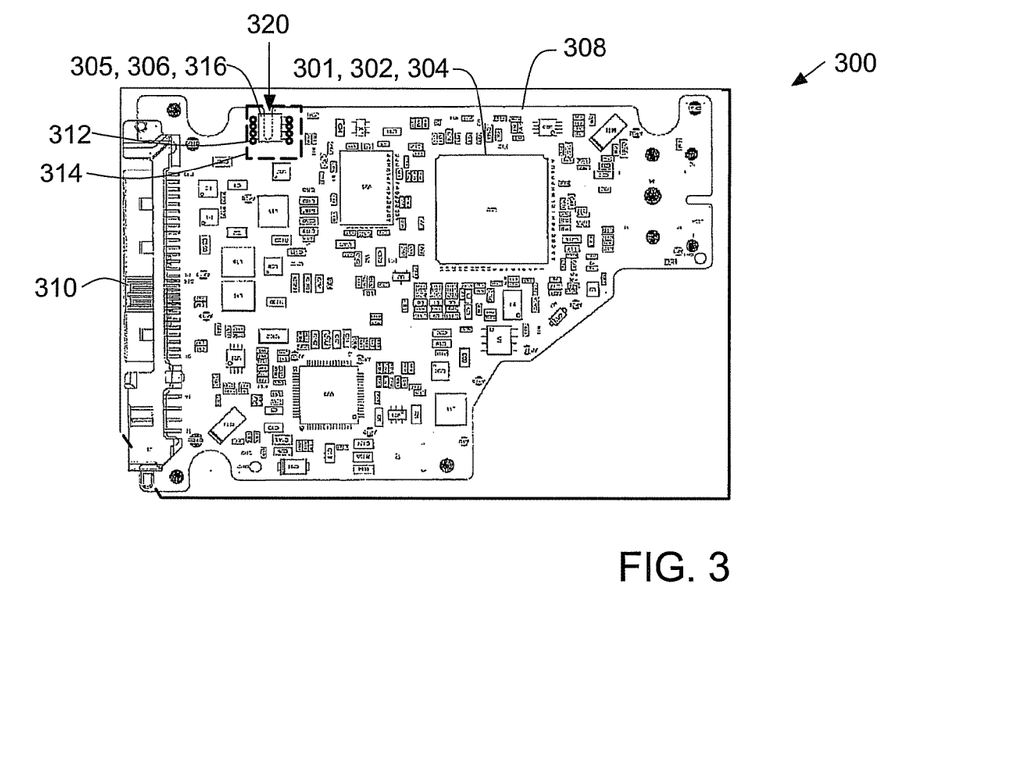
FIG. 3 illustrates a disc drive with a hardware key device installed over a slot in a printed circuit card.

FIG. 3 illustrates a data storage device that includes a disc drive 300. The view shown in FIG. 3 includes a bottom side view of a disc drive, in other words a side that is substantially hidden from view in FIG. 1.

The disc drive 300 includes data storage media (such as disk pack 106 in FIG. 1) that stores a media key and encrypted data as described above in connection with FIG. 2.

The disc drive 300 includes a controller 301, including an encryption/decryption engine 302 and a root key 304. The encryption/decryption engine 302 communicates the encrypted data to the data storage media. Then encryption/decryption engine 302 decrypts the encrypted data that is read from the storage media as a function of the media key, a root key 304, a user key, and a destructible key 306.

The disc drive 300 includes a circuit card assembly 308. The circuit card assembly 308 connects the encryption/decryption engine 302 to the data storage media as described above in connection with FIG. 2. The circuit card assembly 308 includes a first connector 310 that receives the user key. The circuit card assembly 308 includes a second electrical interface 312 that receives the destructible key 306.

The disc drive 300 includes an installation space 314. The installation space 314 is adjacent the second connector 312. A hardware key device 316, which includes one or more destructible keys 306, connects to the second connector 312. The hardware key device 316 includes nonvolatile memory 305 in which the destructible key 306 is stored. The hardware key device 316 is installed in the installation space 314 in a position where the hardware key device 316 is exposed to receive a destructive mechanical force. The hardware key device 316 is electrically connected to the encryption/decryption engine 302 to communicate a destructible key 306 from the nonvolatile memory 305 to the encryption/decryption engine 302. The circuit card assembly 308 includes a circuit board slot 320 that is aligned with the hardware key device 316 in the installation space 314.

In accordance with certain aspects, the second connector 312 includes printed conductors (such as plated through holes) adjacent the circuit board slot 320 in printed circuit board material. The printed conductors extend to the hardware key device 316. The hardware key device 316 is installed over the slot 320 to be vulnerable to the destructive mechanical attack by a tool.

In accordance with certain aspects, the second connector 312 includes an integrated circuit connector, and the hardware key device 316 includes an integrated circuit package that includes pins that mate and demate with integrated circuit connector with or without the use of tools.

Figure 4:
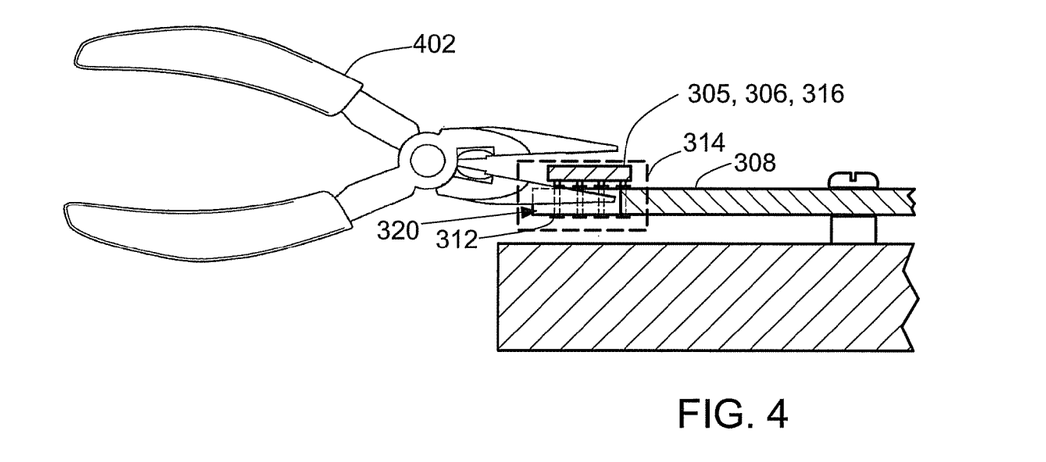
FIG. 4 illustrates use of needle nose pliers to attack and crush a hardware key device to destroy a destructible key in an installation space.

As illustrated in FIG. 4, needle nose pliers 402 is used to attack and crush the hardware key device 316, ending any further access to encrypted data stored on the magnetic media. When the destructible key 306 in the hardware key device 316 is destroyed, one of the essential keys needed to decrypt the encrypted data is lost. The destructible key 306 is not readable by a user or an intruder. The user can not make a separate copy or record of the destructible key 306.

After destruction or removal of the hardware key device, a photograph of the data storage device can be taken, providing evidence of the destruction of the data storage device's data.

Figures 5, 6:
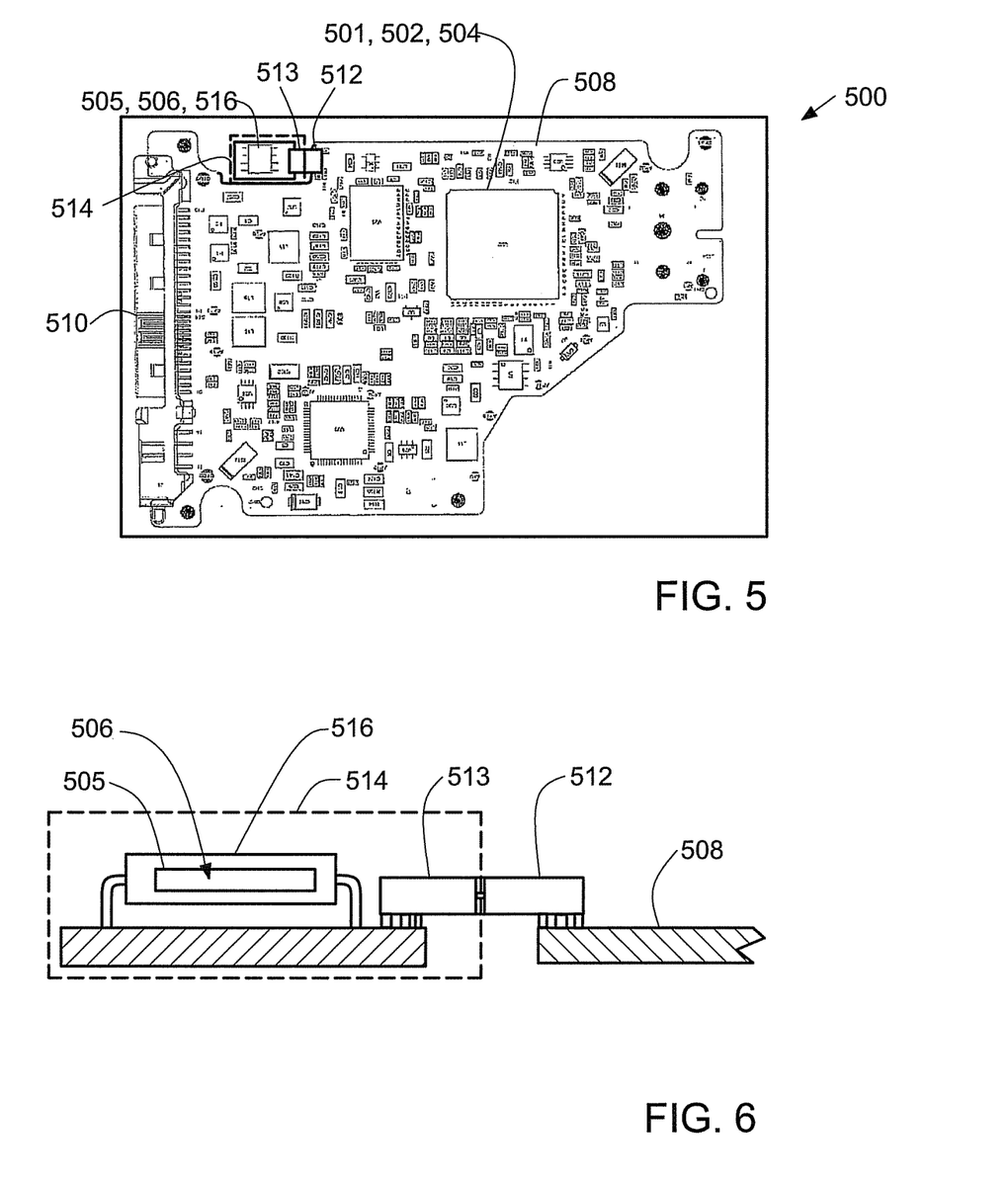
FIGS. 5-6 illustrate a disc drive that includes a hardware key device connected to a printed circuit board by a connector that is mateable and demateable.

FIGS. 5-6 illustrate a data storage device that includes a disc drive 500. The view shown in FIG. 5 includes a bottom side view of a disc drive, in other words a side that is substantially hidden from view in FIG. 1.

The disc drive 500 includes data storage media (such as disk pack 106 in FIG. 1) that stores a media key and encrypted data as described above in connection with FIG. 2.

The data storage drive 500 includes a controller 501 that comprises an encryption/decryption engine 502 and a root key 504. The encryption/decryption engine 502 communicates the encrypted data to the data storage media. Then encryption/decryption engine 502 decrypts the encrypted data that is read from the data storage media as a function of the media key, the root key 504, a user key, and a destructible key 506.

The data storage drive 500 includes a circuit card assembly 508. The circuit card assembly 508 connects the encryption/decryption engine 502 to the data storage media as described above in connection with FIG. 2. The circuit card assembly 508 includes the root key 504. The circuit card assembly 508 includes a first connector 510 that receives the user key. The circuit card assembly 508 includes a second connector 512 that receives the destructible key 506.

The data storage drive 500 includes an installation space 514. The installation space 514 is adjacent the second connector 512. A hardware key device 516, which includes the destructible key 506, includes a connector 513 that connects to the second connector 512. In accordance with certain aspects, the connectors 512, 513 are mateable and demateable. The hardware key device 516 includes nonvolatile memory 505 in which the destructible key 506 is stored. The hardware key device 516 is installed in the installation space 514 in a position where the hardware key device 516 is exposed to receive a destructive mechanical force. The hardware key device 516 is connected to the second connector 512 to communicate the destructible key 506 from the nonvolatile memory 505 to the encryption/decryption engine 502.

In accordance with certain aspects, the connector 512, 513 includes USB connectors such as USB Mini A, USB Mini B, USB Micro A or USB Micro B that connect (mate), disconnect and remate. In accordance with certain aspects, the second connector 512 includes an integrated circuit connector, and the hardware key device 516 includes an integrated circuit package that includes pins that connect (mate), disconnect and demate with the integrated circuit connector, with or without the use of tools. According to further aspects, the second connector 512 includes a printed-circuit board connector, and the hardware key device is soldered to a separate printed circuit board that is connected to the circuit card assembly 508.

Figure 7:
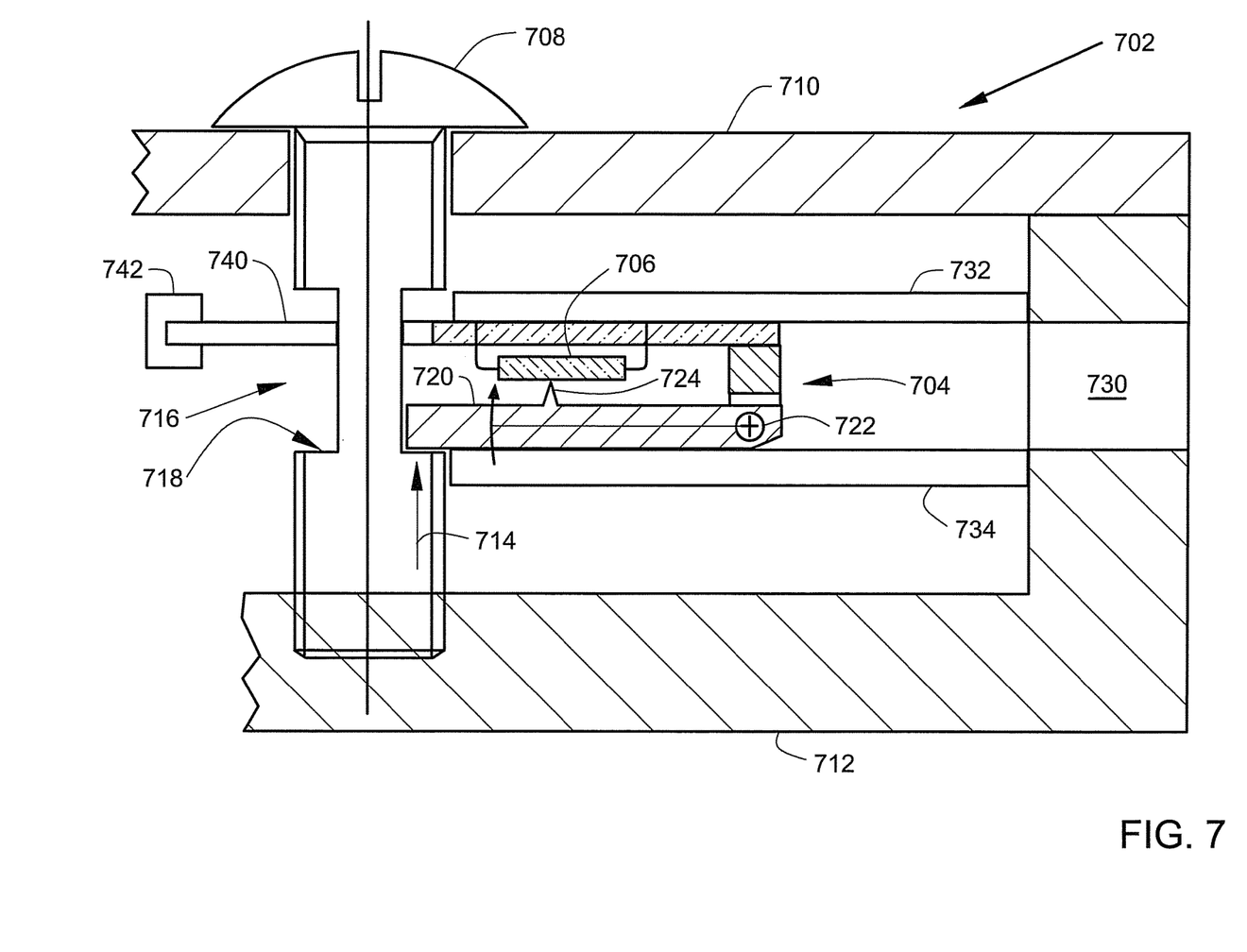
FIGS. 7-8 illustrate a data storage drive that includes a mechanism with a stylus that destroys a hardware key device responsive to tampering with the data storage drive.
Figure 8:
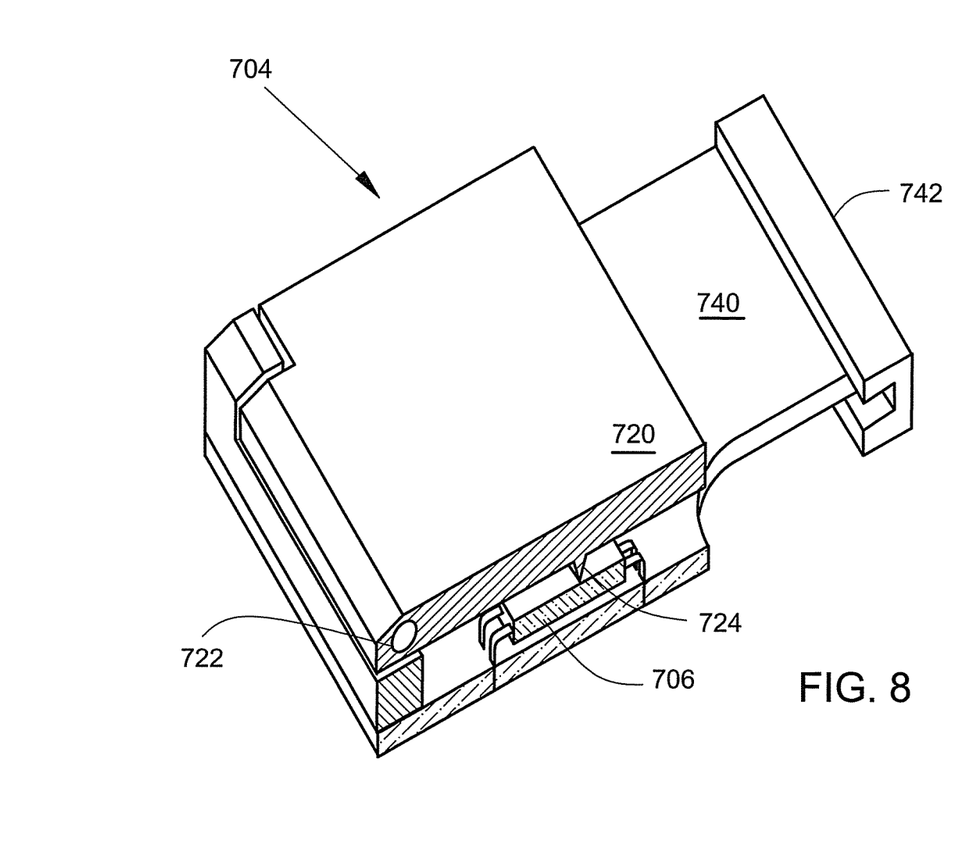

FIGS. 7-8 illustrate a data storage device 702 (FIG. 7) that includes a mechanism 704 (FIGS. 7-8) that destroys a hardware key device 706 responsive to tampering with the data storage device 702. The hardware key device 706 is destroyed by attempted removal of a screw 708 from the data storage device 702. In accordance with certain aspects, the screw 708 has the external appearance of a screw which secures a cover 710 of the data storage drive 702 to a base 712 of the data storage drive 702.

The screw 708 is installed in the data storage device 702, and thereafter, the hardware key device 704 is irreversibly inserted in the data storage device 702 after the screw 708 is installed. The hardware key device 704 includes a stylus actuated by attempted removal of the screw 708 to destroy the electrical function of the hardware key device 704. The hardware key device 704 is inserted in the data storage device 702 by pushing the hardware key device 704 through a hole 730 in the base 712. The base 712 includes rails 732, 732 to guide the hardware key device into the desired operating position shown in FIG. 7. Once the hardware key device 702 is installed, the hole 730 is covered or plugged. Once inserted, the hardware key device 702 is trapped in the data storage device 702 and is difficult to detect and remove.

As the screw 708 is turned in an attempt to remove the screw 708, the screw 708 advances in a direction indicated by an arrow 714. An annular groove 716 is cut into a shank of the screw 708, forming a ring shaped ledge 718. As the screw 708 is turned, the ring shaped ledge 718 advances in the direction indicated by the arrow 714. The ring shaped ledge engages an edge of a lever 720, and forces the edge of the lever 720 in the direction indicated by the arrow 714. The lever 720 pivots on a hinge pin 722. The lever 720 includes a protruding stylus 724. The movement of the stylus 724 exerts a force on an integrated circuit package 706 in the hardware key device, destroying the integrated circuit package 706. The stylus 724 has a sharp point which concentrates or multiplies stress at the sharp point, cracking the integrated circuit package 706, as well as the circuitry contained therein.

In accordance with certain aspects, the hardware key device 704 includes a printed circuit board 740 which includes a printed card edge connector that slides into a connector 742 that is part of the data storage device 702. The connector 742 couples a destructible key to an encryption/decryption engine.

Figure 9:
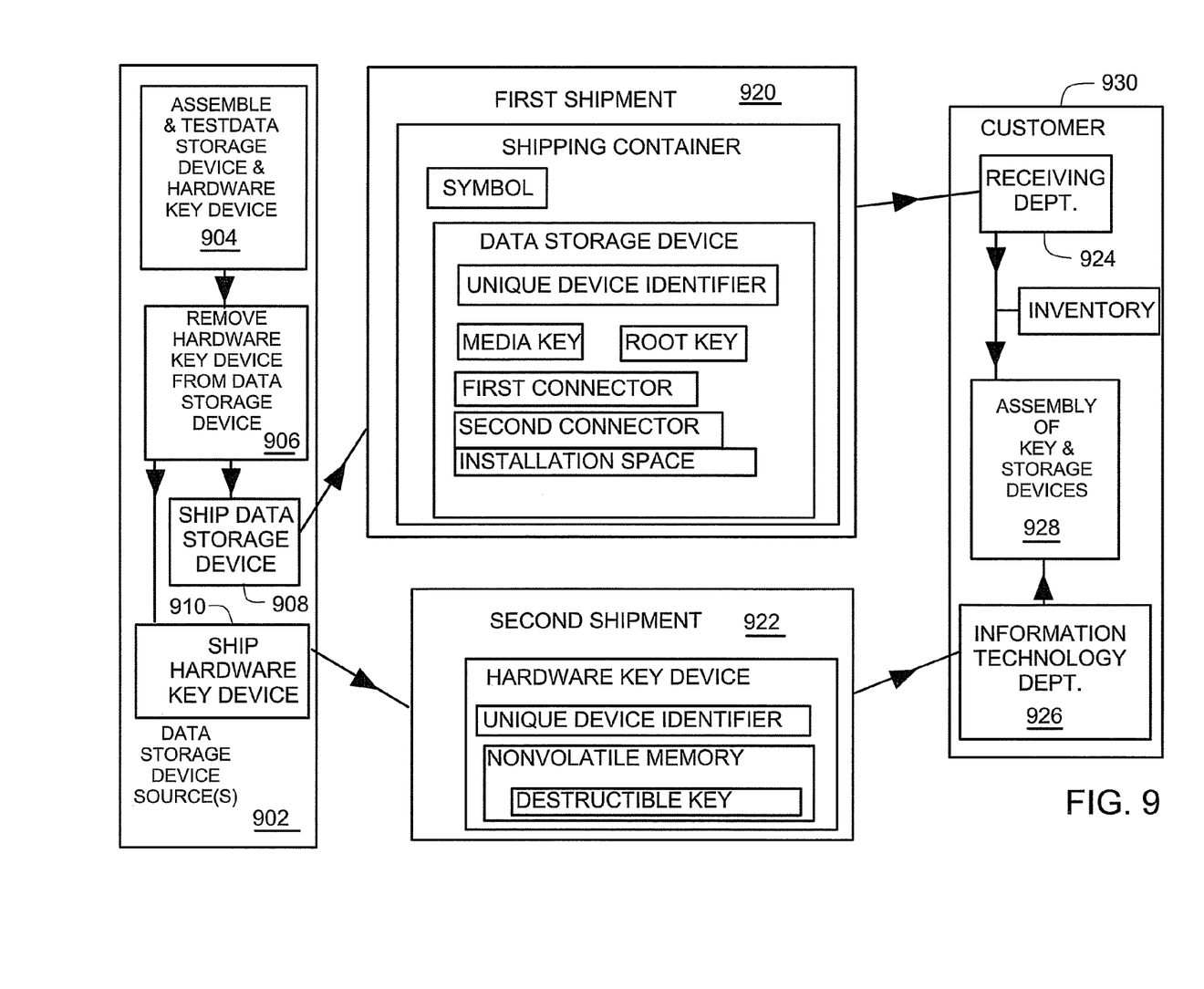
FIG. 9 illustrates a method of protecting a data storage device from in-transit theft.

FIG. 9 illustrates a method of protecting a data storage device from in-transit theft. A source 902 of data storage devices is illustrated in FIG. 9. In accordance with certain aspects, the source 902 includes a manufacturer of data storage devices. In accordance with certain aspects, the source 902 includes a chain of distribution for data storage devices which can include a manufacturer, distributors, resellers, value added resellers (VAR's) and retailers.

The source of data storage devices 902 assembles and tests assembled data storage devices and hardware key devices at step 904. After completion of step 902, the hardware key devices are removed from the data storage devices at step 906. After completion of step 906, the data storage devices are shipped in a first shipment 920 directly or indirectly to customers at step 908. In accordance with certain aspects, the data storage devices are shipped, in first shipments 920, to customers with a simulated, non-functional hardware key device installed in an installation space. The simulated key preferably has an attention-getting, contrasting color and serves as a demonstration of where to insert an actual hardware key device. After completion of step 906, hardware key devices are shipped, in second shipment 922 different than the first shipments 922, to customers at step 910. In accordance with certain aspects, the first shipment 920 is sent by a first transportation method, such as freight shipment, and the second shipment 922 is sent by a second transportation method, such as mail or courier. According to further aspects, the first shipment 922 is sent to a first customer address such as a receiving department, and the second shipment 924 is sent to a second customer address such as an information technology department 926. At a time of installation of a data storage device in a host computer, the information technology department 926 assembles the hardware key device with a data storage device at step 928. Up until step 928, the data storage device remains inaccessible for use because its hardware key device is missing.

The data storage device is provided with a media key stored on media, a root key stored in an electronic circuit, a first connector adapted to receive a user key and a second connector adjacent an installation space adapted to receive a hardware key device. A hardware key device is provided that includes non-volatile memory storing a destructible key. The hardware key device is destructible by mechanical attack. The data storage device is marked with a unique device identifier. A shipping container used in the first shipment 920 is marked with at least one symbol that indicates that an enclosed data storage device is in inoperative condition. The data storage device is shipped in the shipping container in the first shipment 920 to a customer 930 without the hardware key device installed. The hardware key device is shipped marked with the unique device identifier to the customer 930 in a second shipment 922 that is separate from the first shipment.

Figure 10:
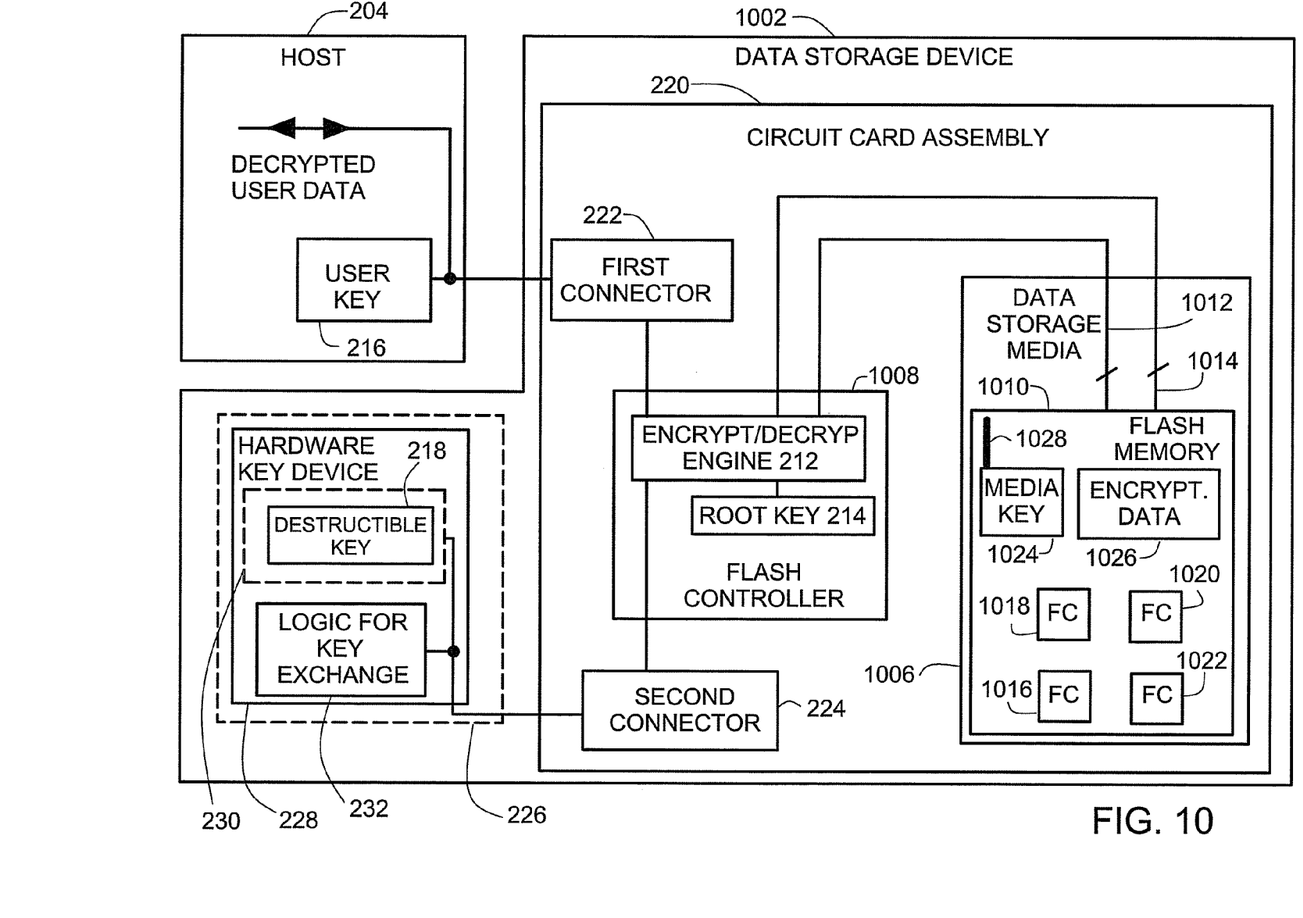
FIG. 10 illustrates a block diagram of a data storage device that includes solid state data storage media.

FIG. 10 illustrates a block diagram of a data storage device 1002 (such as solid-state drive 150 in FIG. 1B) that includes solid state data storage media 1006. The example of the data storage device 1002 is similar to the example of a data storage device 202 described above in connection with FIG. 2, except that the data storage media example in FIG. 10 includes solid state data storage media 1006. Reference numbers used in FIG. 10 that are same as reference numbers used in FIG. 2 identify the same or similar elements, and the description of these reference numbers is omitted here for the sake of brevity.

The data storage media 1006 includes a flash controller 1008 and a flash memory board 1010. The flash memory board 1010 is coupled the flash controller 1008 by an address bus 1012 and a data bus 1014. The data bus 1014 couples encrypted data between the flash controller 1008 and the flash memory board 1010. The flash memory board 1010 includes an array of flash memory chips 1016, 1018, 1020, 1022, 1024, 1026. A media key is stored in the flash memory chip 1024. Encrypted user data is stored in flash memory chips 1016, 1018, 1020, 1022 and 1026. The flash memory board 1010 includes support circuitry (not illustrated) used to energize, address, read, write and erase encrypted data stored in the solid state media. In accordance with certain aspects, a removable hardware jumper 1028 on the flash memory board 1010 is removed at the factory after the media key is stored. The removal of the removable hardware jumper 1028 prevents accidental erasure or alteration of the flash chip 1024 which stores the media key.

A method of protecting data stored on a data storage device is provided. The method includes the providing of a data storage device with encrypted user data and a media key stored on media, a root key stored in an electronic circuit, a first connector adapted to receive a user key and a second connector adjacent an installation space having a hardware key device installed therein. The hardware key device includes non-volatile memory storing one or more destructible keys. The method includes a mechanical destroying of the hardware key device. The destroying renders the encrypted user data non-accessible after the destroying. In accordance with certain aspects, the data storage device functions as a non-encrypted data storage device after the destruction of the hardware key device to enable repurposing of the data storage device to a non-encrypted application. According to further aspects, the destruction of the hardware key device renders the data storage device non-functional, preventing repurposing of the data storage device after destruction of the hardware key.

In accordance with certain aspects, the destructible key is convolved with the user key, the root key and the media key so that the security provided by the user key, the root key and the media key is not diminished. According to further aspects, a combined encryption key is generated using the destructible key to decrypt the user key, and this result is decrypted by the media key, and this result is decrypted by the root key. All of the keys are needed to decrypt user data. Access to a single one of the keys is not valuable without the presence of the other three keys. In accordance with certain aspects, the decryption process includes use of the Advance Encryption Standard (AES), for example:

$$EK=D_{hrk}(Delect(D_{mk}(\text{User Key}))) \qquad \text{Equation 1}$$

where:
EK is the complete encryption key for user data;
Dhrk is a decryption operation using the root key;
Delect is a decryption operation using the destructible key;
Dmk is a decryption operation using the media key; and
User key is a key provided by a user.

In accordance with certain aspects, the nonvolatile memory includes NOR flash memory or phase change memory. According to further aspects the nonvolatile memory includes logic (such as a microcontroller) that performs a secure key exchange via public key cryptography.

It is to be understood that even though numerous characteristics and advantages of various aspects disclose have been set forth in the foregoing description, together with details of the structure and function of various aspects, this disclosure is illustrative only, and changes may be made in detail, especially in matters of structure and arrangement of parts within the principles of the present disclosure to the full extent indicated by the broad general meaning of the terms in which the appended claims are expressed. For example, the particular elements may vary depending on the particular application for the encryption system while maintaining substantially the same functionality. In addition, although a preferred aspect described herein is directed to a disc drive for a magnetic recording system, it will be appreciated by those skilled in the art that the disclosed teachings can be applied to other storage technologies.

What is claimed is:

1. A data storage device comprising:
   a hardware key device installed overlying a circuit board slot in a first installation space where the hardware key device is exposed to receive a destructive mechanical force in-situ, wherein the circuit board slot is aligned with the hardware key device; and
   components other than the hardware key device that are installed in space other than the first installation space, wherein the first installation space and the components other than the hardware key device that are installed in the installation space other that the first installation space are pre-configured in the data storage device prior to shipment of the data storage device from a source at which the data storage device is assembled.

2. The data storage device of claim 1, wherein the components other than the hardware key device comprise:
   data storage media that stores a media key;
   an encryption/decryption engine that encrypts data written to the data storage media and decrypts encrypted data read from the data storage media as a function of the media key, a root key, a user key and a destructible key; and
   a circuit card assembly that connects the encryption/decryption engine to the data storage media, the circuit card assembly comprising the root key, a first connection that receives the user key, and a second connection that receives the destructible key.

3. The data storage device of claim 2, wherein the hardware key device includes nonvolatile memory.

4. The data storage device of claim 3, wherein the hardware key device is electrically connected to communicate the destructible key from the nonvolatile memory to the encryption/decryption engine.

5. The data storage device of claim 4, wherein the destructible key comprises a uniquely valid key for use with a first unique combination of root key and media key in the data storage device, and the destructible key is not valid for use with other data storage devices having combinations of root keys and media keys that are different than the first unique combination.

6. The data storage device of claim 4, further comprising a mechanism in the data storage device that destroys the hardware key device responsive to tampering with the data storage device.

7. The data storage device of claim 4, wherein the hardware key device comprises logic circuitry that performs secure key exchange.

8. The data storage device of claim 7, wherein the secure key exchange comprises Diffie-Hellman key exchange.

9. The data storage device of claim 2, wherein the first connection comprises a data storage device connector that receives the user key from a host system.

10. The data storage device of claim 2, wherein the first connection comprises a biometric sensor connector that receives the user key from a biometric sensor.

11. The data storage device of claim 2, wherein the circuit board slot is in printed circuit board material of the circuit card assembly, and wherein the second connection comprises printed conductors adjacent the circuit board slot in the printed circuit board material, the printed conductors extending to the hardware key device.

12. The data storage device of claim 2, wherein the second connection comprises a connector that is disconnectable and remateable with the hardware key device.

13. A data storage device comprising:
   a data storage medium with encrypted user data stored thereon; and
   a hardware key device with a stored destructible key related to the encrypted user data,
   wherein the hardware key device is installed overlying a slot in a first installation space where the hardware key device is exposed to receive a destructive mechanical force in-situ; and
   wherein the data storage medium is installed in space other than the first installation space, and
   wherein the data storage device further comprises a stylus configured to be actuated by attempted removal of a screw from the data storage device and configured to multiply stresses applied to the hardware key device upon actuation by the attempted removal of the screw.

14. The data storage device of claim 13, wherein the hardware key device comprises logic circuitry that performs secure key exchange.

15. The data storage device of claim 14, wherein the secure key exchange comprises Diffie-Hellman key exchange.

16. The data storage device of claim 1, wherein the circuit board slot is in printed circuit board material of a circuit card assembly, and wherein the circuit board slot is configured to receive a portion of a hardware key destruction tool that is independent of, and unattached to, any component of the data storage device.

17. The data storage device of claim 1, wherein the circuit board slot is configured to receive a jaw of a pair of pliers.

* * * * *